United States Patent
Hartmann et al.

(12) United States Patent (10) Patent No.: US 11,685,450 B2
(45) Date of Patent: Jun. 27, 2023

(54) COUPLING COMPONENT, SYSTEM FOR COUPLING AND METHOD FOR MOUNTING A COUPLING COMPONENT

(71) Applicant: SAF-HOLLAND GmbH, Bessenbach (DE)

(72) Inventors: Mark Hartmann, Sulzbach am Main (DE); Mario Sebastian Köster, Bodman-Ludwigshafen (DE); Stefan Wallmeier, Goldbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 119 days.

(21) Appl. No.: 16/962,449

(22) PCT Filed: Jan. 18, 2019

(86) PCT No.: PCT/EP2019/051208
§ 371 (c)(1),
(2) Date: Jul. 15, 2020

(87) PCT Pub. No.: WO2019/141797
PCT Pub. Date: Jul. 25, 2019

(65) Prior Publication Data
US 2021/0078653 A1 Mar. 18, 2021

(30) Foreign Application Priority Data
Jan. 19, 2018 (DE) ...................... 10 2018 101 169.5

(51) Int. Cl.
*B62D 53/12* (2006.01)
*B62D 53/08* (2006.01)

(52) U.S. Cl.
CPC ......... *B62D 53/12* (2013.01); *B62D 53/0828* (2013.01)

(58) Field of Classification Search
CPC ........ B62D 53/00; B62D 53/12; B62D 53/08; B62D 53/0828; B62D 53/0842; B62D 53/125; B62D 53/085
See application file for complete search history.

(56) References Cited

U.S. PATENT DOCUMENTS 1,976,255 A * 10/1934 Connors ................ B62D 53/08
280/416.3
2,850,292 A * 9/1958 Holland ............... B62D 53/125
280/434

(Continued)

FOREIGN PATENT DOCUMENTS

CN 106114660 A 11/2016
DE 1934459 U 3/1966

(Continued)

OTHER PUBLICATIONS

European Patent Office; International Search Report; dated May 6, 2019.

*Primary Examiner* — Minnah L Seoh
*Assistant Examiner* — Abigail R Hymel
(74) *Attorney, Agent, or Firm* — Price Heneveld LLP (57) ABSTRACT

A cantilevered coupling component for an interface area between a semitrailer and a tractor unit, which can be releasably connected to one another in the interface area by a pin element, the coupling component including a pin-side connection area for pivotally mounting the coupling component on the pin element, and a rail-side connection area for slidable mounting along a translation direction of the coupling component on a rail of the semitrailer.

21 Claims, 4 Drawing Sheets

(56) References Cited

U.S. PATENT DOCUMENTS

| | | | | |
|---|---|---|---|---|
| 3,109,669 A | * | 11/1963 | Arnett | B62D 53/12 |
| | | | | 280/434 |
| 4,556,232 A | | 12/1985 | Sever | |
| 4,949,987 A | | 8/1990 | Gallatin | |
| 5,558,351 A | | 9/1996 | Hunter | |
| 5,566,963 A | * | 10/1996 | Johnson | B62D 53/068 |
| | | | | 280/439 |
| 8,840,128 B2 | | 9/2014 | Glazner | |
| 2004/0021291 A1 | | 2/2004 | Haug et al. | |
| 2010/0059967 A1 | * | 3/2010 | Alguera | B62D 53/125 |
| | | | | 280/420 |
| 2011/0037241 A1 | * | 2/2011 | Temple | B60D 1/64 |
| | | | | 280/421 |
| 2013/0193669 A1 | | 8/2013 | Glazner | |
| 2015/0008656 A1 | * | 1/2015 | Shirk, Jr. | B60D 1/28 |
| | | | | 280/432 |

FOREIGN PATENT DOCUMENTS

| | | | |
|---|---|---|---|
| DE | 102004024333 A1 | 12/2005 | |
| DE | 102006033899 A1 | 1/2008 | |
| DE | 20 2014 006 186 U1 | 9/2014 | |
| DE | 202014006186 U1 * | 9/2014 | B62D 21/20 |

\* cited by examiner

COUPLING COMPONENT, SYSTEM FOR COUPLING AND METHOD FOR MOUNTING A COUPLING COMPONENT

BACKGROUND OF THE INVENTION

The present invention relates to a coupling component, a system for coupling between a tractor unit and a semitrailer and a method for connecting a coupling component to a semitrailer.

The connection of a semitrailer to a tractor unit is sufficiently well known from the state of the art. For this purpose, the semitrailer typically has a pin element, in particular a kingpin, which engages in a coupled state in a corresponding fifth wheel coupling, or coupling plate with coupling hook, on the tractor unit. In addition to the mechanical connection of the semitrailer to the tractor unit, successful coupling of the semitrailer to the tractor unit also includes the connection of lines on the tractor unit side and on the trailer side, such as air pressure lines and electrical lines which are required to supply the lighting system or other electronics. A coupling component is preferably provided to guide the lines, in or on which the lines are guided to an interface area provided for the desired connection. This coupling component is preferably mounted so that it can be swivelled in order to be able to easily align the lines for the coupling when the tractor unit and the semitrailer are aligned at an angle, i.e. not aligned, with each other during coupling. From the state of the art, such as DE 10 2006 033 899 A1, it is known that this coupling component can be pivoted at a single point, for example by means of a turntable or clewing ring. However, such an approach requires a complex routing of the cables through the turntable or steering bogie, which means that a structure above the kingpin must be adapted. Alternatively, the state of the art also knows how to connect the coupling component via a sleeve that embraces the kingpin. However, it has been found that such a connection is limited in terms of its resilience, especially when the load is increased due to a higher bending moment, which in turn inevitably occurs with increasing length of the coupling component.

Based on this background, the present invention makes it its object to provide an improved coupling component which can also withstand increased loads and can be connected to the semitrailer without a turntable.

SUMMARY OF THE INVENTION

In accordance with the invention, a coupling component, in particular a cantilever, is provided for an interface area between a semitrailer and a tractor unit, which can be releasably connected to one another in an interface area via a pin element, comprising a pin-side connection area for pivotably mounting the coupling component on the pin element and a rail-side connection area for a slidable mounting of the coupling component on a rail of the semitrailer following a direction of translation. In contrast to the state of the art, the coupling component according to the invention can be connected or attached to the semitrailer via two different connection areas—one pivotable and one displaceable—whereby the forces acting on the coupling component from the outside are better distributed, in particular in comparison to an articulation via a single point or articulation point. The coupling component is preferably connected to the semitrailer without a turntable. In particular, it is intended that the pin-side connection area and the rail-side connection area are opposite each other, preferably at opposite ends of the coupling component. Basically, a coupling component is to be understood as a component which is part of a mechanism for coupling the semitrailer to the tractor unit. As a cantilever, the coupling component serves in particular for guiding or supporting trailer-side lines, which are connected in the interface area with corresponding tractor-trailer-side lines. For example, the lines are gas pressure or air pressure lines or electrical lines which are intended for supplying the lighting system or other electronics. The lines can, for example, be attached individually or as a bundle on the coupling component. Concurrently, the coupling component or the cantilever must be mounted so that it can swivel relative to the pin element. The pin element is preferably the kingpin, which is designed to engage in a complementary fifth wheel coupling on the tractor unit when coupled. Furthermore, it is preferably provided that the coupling component has a basic body, in particular a fork-shaped basic body, with side arms. The shape of the basic body is essentially adapted to an entrance area or a mouth-like entrance opening of the fifth wheel coupling or coupling plate, and the entrance area is arranged on the side of the fifth wheel coupling facing the semitrailer in the assembled state. In particular, the basic body is designed in such a way that it is guided or aligned by the entrance area or the entrance opening of the fifth wheel coupling when coupling. Furthermore, it is intended that the rail and the coupling component are mounted on an underside of the semitrailer. In the mounted state, the coupling component is hinged to the pin element and is mounted on the rail of the semitrailer so that it can be displaced, especially in translation. The direction of translation follows an arcuate course which is concentric to the pin element.

Expediently, the rail runs at least partially in a rectilinear line and/or in a partial circle. Preferably, the partial circular rail extends concentrically to the pin element. For example, the rail extends over an angular range greater than 45°, preferably greater than 135° and most preferably greater than 180°. The partial circular rail or the areas of the partial circular rail run parallel to the direction of translation in particular. Furthermore, it is intended that the straight rail areas run parallel to the edges of a base plate or the vehicle frame of the semitrailer and in particular, at least for the most part, do not follow the direction of translation. It is also conceivable that rectilinear and partial circular areas alternate. It is particularly preferred that the partial circular area of the rail is located behind the pin element, viewed in the direction of travel. In particular, the rail is symmetrical, in particular mirror-symmetrical to an imaginary central axis running through the middle of the trailer. If several partial circular areas are provided, these partial circular areas can preferably be assigned the same radius of curvature.

The rail is preferably designed as a web and/or groove. The web, for example, protrudes from the underside of the semitrailer. For example, the web is mounted on the underside via one or more flanges, in particular welded or screwed-on. The rail-side connection area can be mounted relatively easily on such a web. Preferably, the rail-side connection area is hooked into the web in the assembled state. It is also intended that the web has a profiled cross-section in a plane extending perpendicular to the direction of translation. Such a cross-section can be used to advantage to guide a complementary profile on the rail-side connection area of the coupling component. It is also conceivable that the web has an undercut, a stepped course and/or a groove. Preferably, the profile is located on the side of the web facing the underside of the semitrailer. In this way the profile faces away from the roadway and is protected accordingly. Preferably, the rail is designed as a groove recessed into the underside of the semitrailer. As such a groove, the rail is recessed in the underside of the semitrailer and cannot cause any damage when the semitrailer is swivelled. In order to equip an existing semitrailer with such a groove, a plate can be imagined which can be mounted on the underside of the semitrailer and in which in turn a groove is recessed.

Preferably, a ratio between a rectilinear extending portion of the rail and a partially circularly extending portion assumes a value between 0.1 and 0.6, preferably between 0.2 and 0.5 and most preferably between 0.35 and 0.48. As the rectilinear extending portion increases, additional measures become necessary to ensure the pivoting movement of the coupling component, whereas a completely partial circular rail, in particular a semi-circular rail, fills the installation space. It has been found that for a ratio between 0.35 and 0.48 a comparatively compact system of coupling component and rail can be provided, whose additional measures also allow stable and reliable swivelling over the rectilinear portion of the rail.

Expediently, the coupling component in the assembled state is pivotable about the pin element by at least a pivot angle of 145°, preferably 160° and most preferably 180°. This allows the coupling component to be deflected relatively far on both sides. Such a wide deflection also facilitates coupling for alignments of semitrailer and tractor unit where the central axes of semitrailer and tractor unit enclose an angle greater than 90°.

Preferably, a coupling structure and/or a slide element for connection to the rail is arranged in the rail-side connection area. Preferably, the coupling structure is designed to complement the cross-sectional profile of the rail. This allows the rail-side connection area to be guided over the rail. Furthermore, it is preferable that a slide element is provided as a link between the rail and the rail-side connection area. For example, such a slide element engages in a corresponding groove and can be guided in this groove when swivelled. Furthermore, it is conceivable that the rail includes a lubricant channel to supply the contact points between the rail and the slide element or the coupling structure with lubricant.

Furthermore, it is preferable if the rail and/or the slide element is coated, preferably with a rubber-like coating. It is preferably provided that the coating is located at the contact point between rail and slide element. This not only reduces wear on the rail and slide element, but also reduces damping or noise generation during relative movement of the rail and carriage element. For example, it is conceivable that the slide element has rollers that are at least partially, preferably completely, encased in the coating. Preferably, the side arms of the coupling component, in particular on their outside, are additionally provided with a damping coating in order to dampen any noise otherwise generated when the side arms strike the fifth wheel coupling during coupling. The load on the side arms is also reduced.

Furthermore, it may be useful to have stop elements at the end of the rail, which are in particular designed to dampen the impact of the coupling element. For example, such a stop can be implemented as a rubber element or plug at the ends of the rail.

According to a further embodiment of the present invention, it is intended that the rail has sensor elements, the sensor elements being configured to determine the current position of the coupling component on the rail. For example, it is one or more pressure sensors, or a camera. The detection of the current alignment can contain information about the relative position between the tractor and the semitrailer, which can be used for an automatic coupling process, for example.

Furthermore, it is preferably intended that the coupling component, in particular its coupling structure, interacts with the rail in such a form-fit manner that the form-fit essentially prevents relative movement along a vertical direction. In particular, the coupling component and the rail are designed in such a way that the form fit prevents the coupling component from being able to detach from the rail by a vertical movement. This is advantageous in preventing the coupling component from accidentally coming loose from the rail as a result of operational vibrations.

Furthermore, it is conceivable that the coupling component is connected to the rail at several contact points, the contact points being spaced from each other along the rail. This increases the stability of the coupling component against torsion from the horizontal plane.

Expediently, the coupling component, the slide element and/or the rail is dimensionally variable, in particular extendable, for increasing the potential angle of pivoting. By these dimensional changes it is advantageously possible to ensure a swivel movement for the coupling structure even beyond the partial circular portion. The consequence is that the rail-side connection area can continue to follow the direction of translation if the rail is no longer parallel to the direction of translation. It is conceivable that the dimensional change can be realized as a change in length. Preferably, the slide element and the rail can be extended in a direction following the translation direction. In this way, the potentially available path in the translation direction can be extended. With the coupling component, the change in length occurs radially outwards as seen from the pin element. This allows the increasing distance between a rectilinear rail and the coupling component to be bridged during pivoting, thus ensuring the freedom of movement of the coupling component during pivoting. It is also conceivable that the coupling component is elastically deformable and at least supports the extension in radial direction.

Preferably, a ratio of a first side length, which the coupling component, the slide element or the rail has in a retracted state, to a second side length, which the coupling component, the slide element or the rail has in an extended state, assumes a value between 0.1 and 0.6, preferably between 0.2 and 0.55 and most preferably between 0.41 and 0.49. The first side length and the second side length are dimensioned for the slide and the rail in a direction following the direction of translation and for the coupling component in a direction extending radially from the pin element.

The first or second side length is understood to be, in particular, a corresponding overall extension of the respective component. Preferably, the coupling component, the slide element or the rail can be extended to both sides. For the ratio between 0.41 and 0.49, it has proven to be advantageous that a particularly stable and compact system of rail and coupling component can be provided, which functions reliably with large deflections.

The coupling component is advantageously designed for automatic coupling of the tractor unit and the semitrailer. This means that the coupling component can be aligned actively or passively during automatic coupling of the semitrailer to the tractor unit.

Expediently, the rail, the coupling component and/or the slide element is designed in multipiece form. This makes it easy to create a telescopic mechanism that allows the desired dimensional change, preferably length change. In the coupling component, preferably a telescopic mechanism is integrated in a part extending radially outwards from the pin element, for example in the side arms of the basic body, in a first longitudinal beam and/or in a second longitudinal beam. Furthermore, it is provided that the multipiece component, i.e. the coupling component, the slide element and/or the rail, has a restoring mechanism which returns the component, for example after a pivoting movement, back to its state of rest.

Preferably, the pin-side connection area has a sleeve for connecting to the pin element. With the sleeve, a pivoting connection to the pin element can be realized as easily as possible. Connecting or a connection is preferably understood to be a connection that requires a measure of mutual release or separation to separate the connected component. For example, the sleeve completely encloses the pin element. However, it is also conceivable that the sleeve has an opening, for example in the form of a slot, on its side facing towards or facing away from the rail-side connection area.

Expediently, a ratio between a sleeve width of the sleeve in the pin-side connection area and a pin length assumes a value between 0.1 and 0.5, preferably between 0.25 and 0.48 and most preferably between 0.35 and 0.45. For the ratio between 0.35 and 0.45, it has been found that the resulting flat contact allows the loads to be distributed as evenly as possible over the kingpin. At the same time, an exposed area on the kingpin element is sufficiently large to allow undisturbed coupling to the fifth wheel coupling on the tractor unit.

Preferably, lines are or can be arranged inside and/or outside the coupling component in the assembled state. In this way, the lines can be routed in a controlled and targeted manner using the coupling component. In particular, the coupling component can also be used to ensure that no lines hanging down get caught in the tractor-trailer combination during the coupling process. The lines are preferably attached to the coupling component in such a way that they run at the level of the side arms when mounted. It is advantageous if the lines run inside the coupling component. In this way, the lines are advantageously protected by the coupling component. Preferably, individual lines and/or cable bundles are mounted on the coupling component.

It is advisable that the coupling component comprises a device for extending a line. This allows the corresponding line to ensure the necessary change in length during the swivel movement, so that the swivel movement of the coupling component is not limited by the length of the line or the probability of damage is reduced. For example, the device for extending a line is a cable drum in which the line is pre-tensioned with a torsion spring. However, it is also conceivable that the device for extending the line uses a telescopic mechanism. In this case, for example, a first line section and a second line section are connected via a sheathing element, wherein the sheathing element is slidably mounted in a holding device. The sheathing element is preferably pretensioned against the holding device via a spring element when the coupling component is pivoted.

A further object of the present invention is a system for coupling, in particular automatic coupling, between a tractor unit and a semitrailer, comprising a rail and a coupling component which can be mounted pivotally on a pin element of the semitrailer via a pin-side connection area and displaceably along a translation direction on the rail with a rail-side connection area.

Preferably, the system comprises a pin element in addition to the rail and the coupling component. All features and advantages described for the coupling component according to the invention and its preferred embodiments can also be transferred to the system according to the invention and vice versa.

A further object of the present invention is a method for mounting a coupling component, in particular for upgrading a semitrailer, the coupling component having a pin-side connection area for pivotably mounting the coupling component on the pin element and a rail-side connection area for slidably mounting the coupling component on a rail, the coupling component being connected to the pin element and the rail. All features and advantages described for the coupling component according to the invention and its preferred embodiments can also be transferred to the method according to the invention and vice versa.

BRIEF DESCRIPTION OF THE DRAWINGS

Further advantages and features result from the following description of preferred embodiments of the subject matter of the invention with reference to the attached figures. Individual features of the individual embodiments can be combined within the scope of the invention. It is shown in FIG. 1 is a perspective view of a coupling component according to a first exemplary embodiment.

DETAILED DESCRIPTION OF THE PREFERRED EMBODIMENTS

Figure 1:
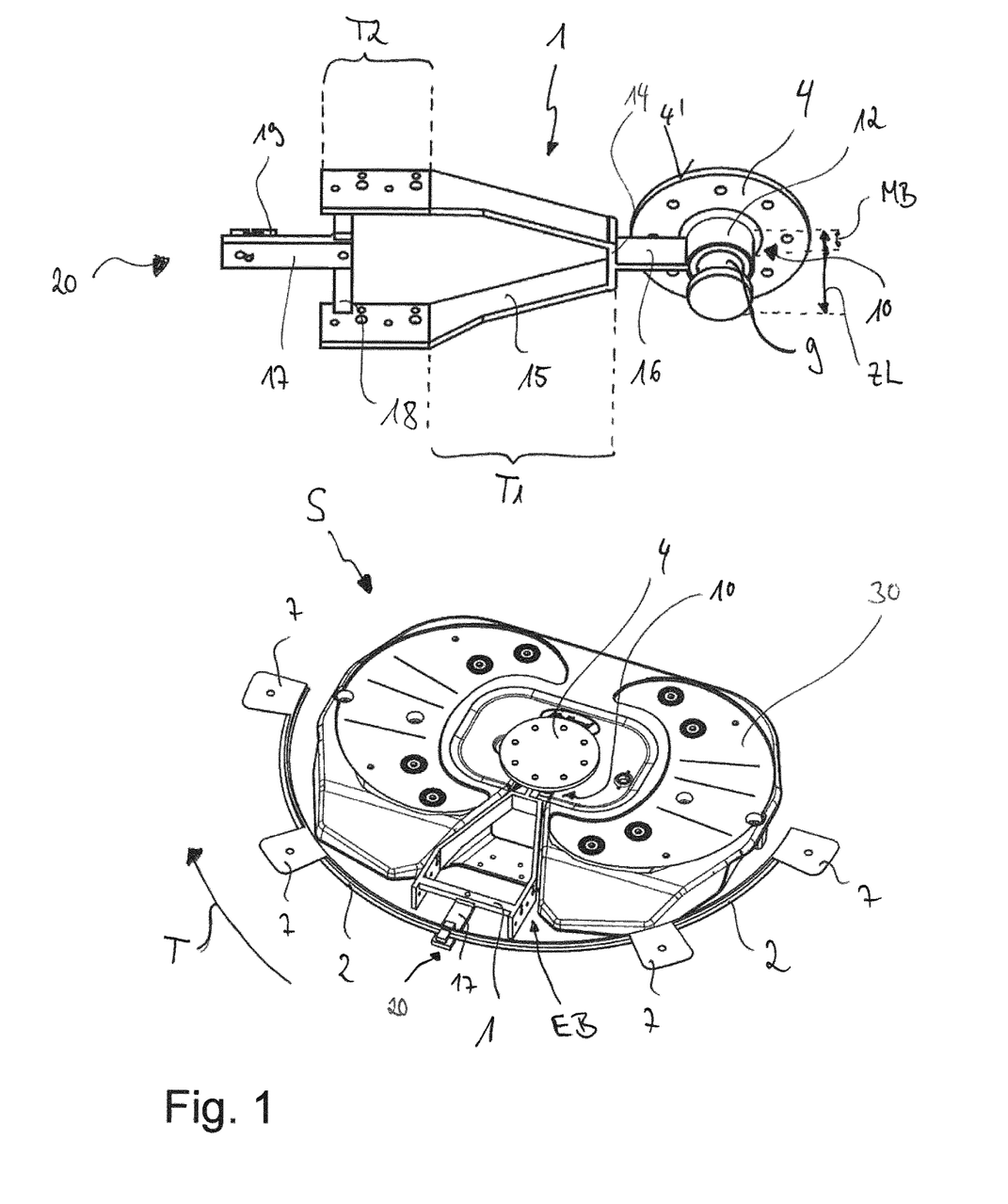

FIG. 1 shows a coupling component 1 according to a first exemplary embodiment of the present invention. Such a coupling component 1 serves as a supporting structure or housing for lines which, when coupling a semitrailer to a tractor unit, are to be led to a corresponding connection area on the semitrailer side and connected to it. In particular, the alignment, approach and connection are to be carried out automatically, i.e. when coupling the semitrailer to the tractor unit, the cable is connected without any additional manual work step. The lines are, for example, electrical lines and/or air pressure lines. The connection between the semitrailer and the tractor unit is made by means of a pivot element 9, in particular a kingpin, which is connected to a lower side of the semitrailer with a fastening plate 4 in a rotationally fixed manner. When coupled, the kingpin element 9 engages in a corresponding fifth wheel coupling 30 of the tractor unit in an entrance region EB, forming an interface area S (see lower illustration in FIG. 1).

To reduce the loads acting on the coupling component 1, it is intended that the coupling component 1 (see upper illustration in FIG. 1) has a pin-side connection area 10 and a rail-side connection area 20. This is advantageous in that it allows the coupling component 1 to be pivoted via two points, which in turn improves the distribution of the loads. It is intended that the coupling component 1 with the pin-side connection area 10 is pivotally connected to the pin element 9 and is mounted with the rail-side connection area 20 displaceably along a translation direction T on a rail 2. The rail 2 is part of the semitrailer or rigidly connected to the semitrailer. Preferably, the rail 2 extends over at least 180°, in particular concentrically to the pin element 9, i.e. semicircularly. In the example shown in FIG. 1, the rail 2 can be attached to the underside of the semitrailer by means of several flanges 7 and, once attached, projects downwards from the semitrailer.

The coupling component 1 preferably comprises a basic body, in particular a fork-shaped basic body, with side arms 15 which, viewed in the longitudinal direction of the coupling component 1, are connected to one another by a first cross member 14 on the side facing the pin element 9 in the assembled state and by a second cross member 18 on the side facing the rail 2 in the assembled state. The first cross member 14 and the second cross member 18 are aligned essentially parallel to each other. Furthermore, the side arms 15 are designed in such a way that in a first sub-area T1 the distance between the side arms 15 increases in the direction of the rail-side connection area 20 and in a second sub-area T2 the distance between the side walls 15 is essentially constant. It is further provided that on the side facing the pin element 9 a first longitudinal beam 16 protrudes from the first cross member 14. The first longitudinal beam 16 preferably connects the basic body with a sleeve 12 in which the pin element 9 is mounted. Preferably, a length of the first longitudinal beam 16 is greater than a radius of the fastening plate 4, to which the pin element 9 is non-rotatably mounted, or the first longitudinal beam 14 is dimensioned in such a way that it protrudes radially from the outermost edge 4' of the fastening plate 4 as seen from the pin element 9.

A second longitudinal beam 17 protrudes from the second cross member 18 in the direction of rail 2, in particular radially seen from the pin element 9, wherein the longitudinal beam 17 comprises a coupling structure 19 at one end. Preferably, the second longitudinal beam 17 is aligned in such a way that its largest side faces the rail 2 in the assembled state. Furthermore, the second cross member 18 is arranged in the assembled state on an upper edge region of the side arms 15, which faces the underside of the semitrailer. The coupling structure 19 is shaped complementary to the contour of the rail 2 and thus ensures the sliding movement of the second longitudinal beam 17 on the rail 2 along the translation direction T. In particular, the coupling structure 19 is hooked into the rail 2 in the assembled state. For example, the coupling structure 19 is a groove, a stepped course and/or an undercut.

Figure 2:
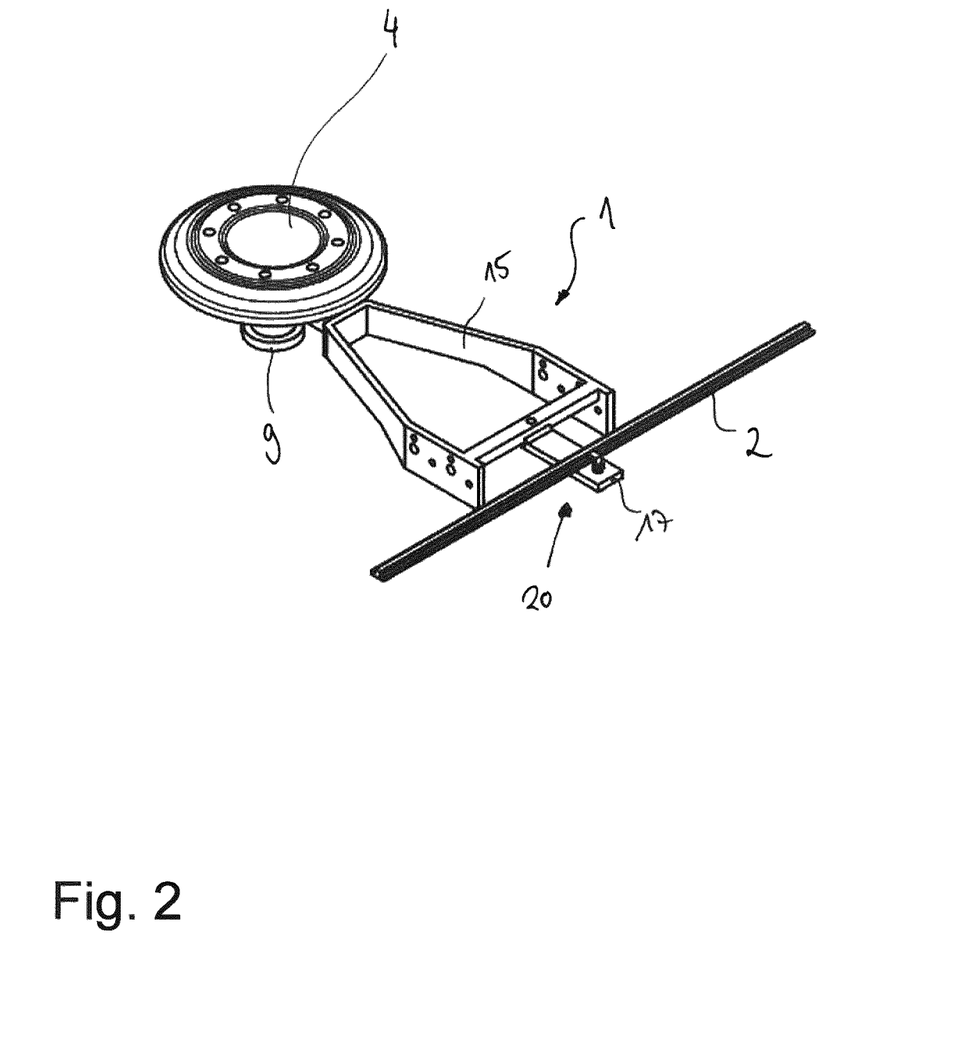
FIG. 2 is a perspective view of a coupling component according to a second exemplary embodiment of the present invention.

FIG. 2 shows a second exemplary embodiment of the present invention. The embodiment shown here differs from the embodiment shown in FIG. 1 in that the rail 2 is not curved or partially circular, but runs rectilinear. In order to ensure the freedom of movement of the second longitudinal beam 17 along rail 2 during operation, it is preferably provided that the second longitudinal beam 17 is variable in length. For this purpose, the second longitudinal beam 17 is preferably designed in multipiece form and telescopically.

Figure 3:
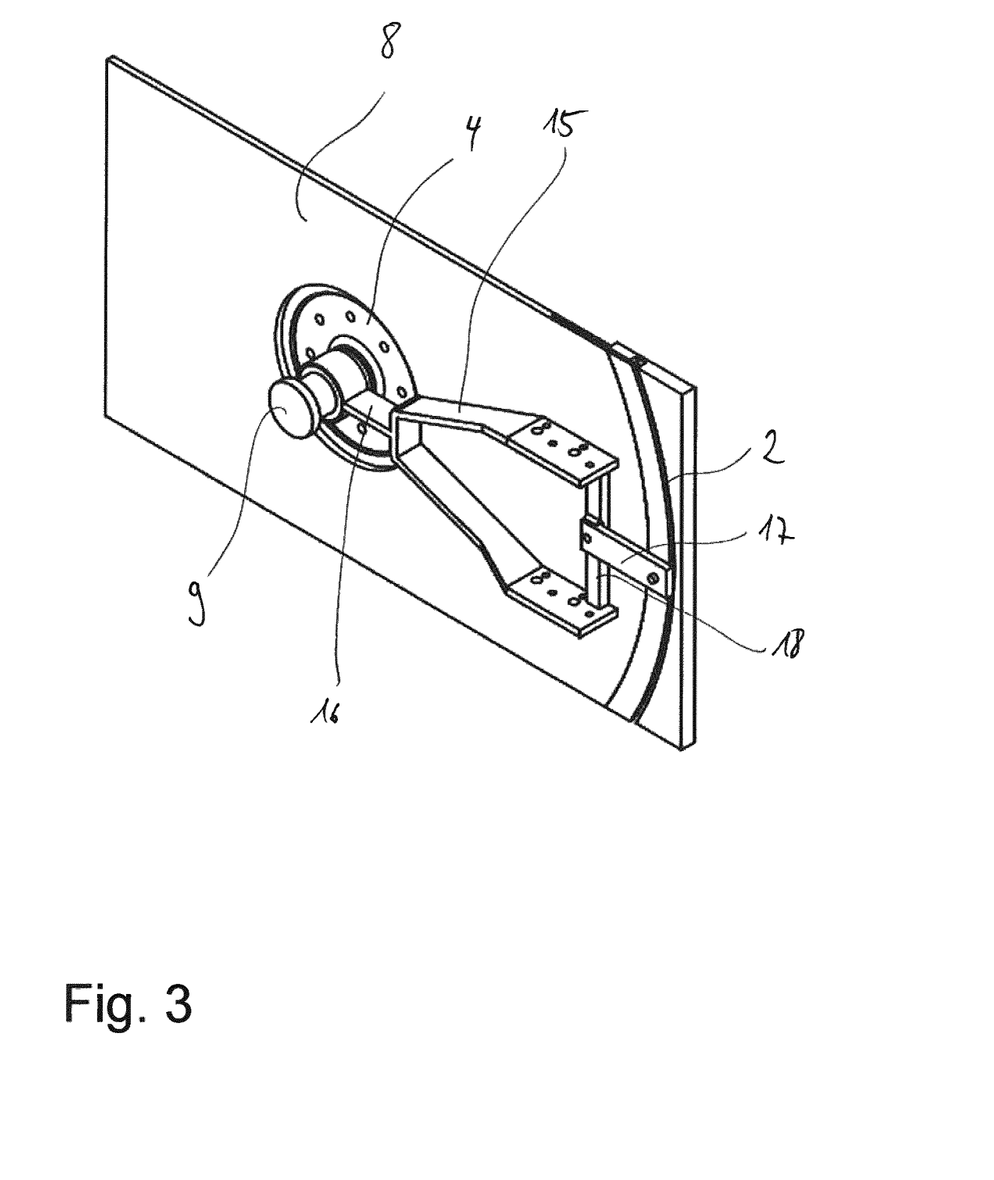
FIG. 3 is a perspective view of a coupling component according to a third exemplary embodiment of the present invention.

In the embodiment shown in FIG. 3, the rail 2 is designed as a groove on the trailer side, which is particularly recessed in a base plate 8 on the underside of the semitrailer. This means that the rail 2 does not protrude downwards from the semitrailer and in this form cannot cause any damage when the semitrailer is swivelled.

Figure 4:
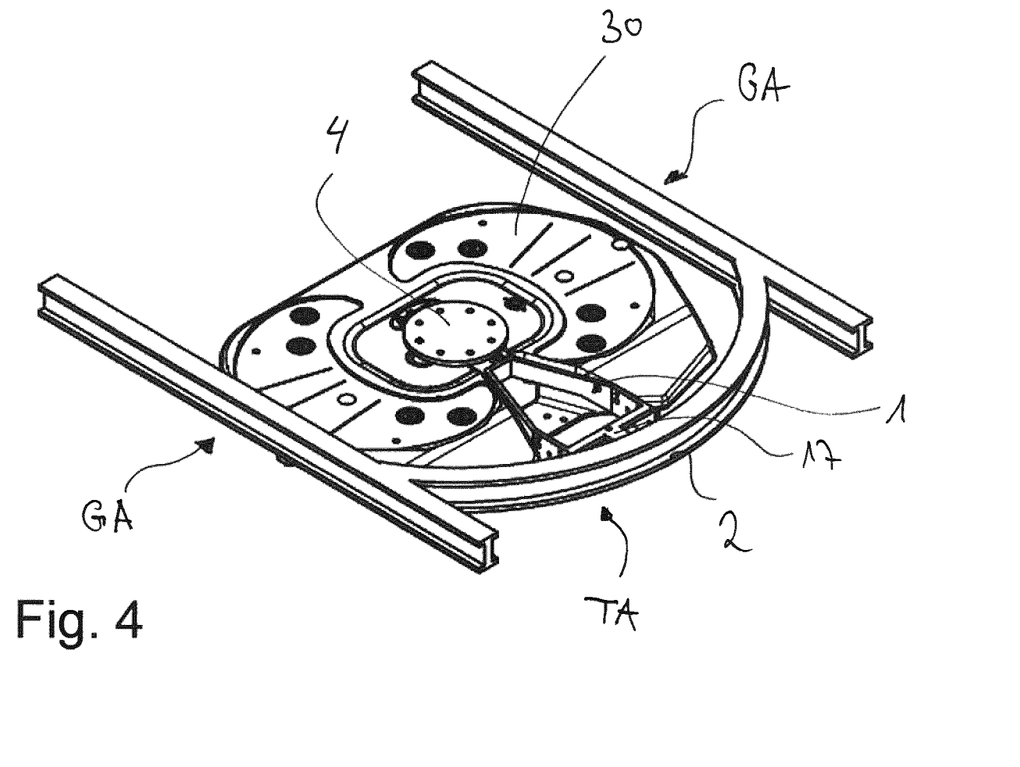
FIG. 4 is a perspective view of a coupling component according to a fourth exemplary embodiment of the present invention.

In the embodiment shown in FIG. 4, the rail is designed as a double T-beam and the couple structure 9 engages in a guide groove formed on the side of the double T-beam. It is also provided that the rail 2, which is designed as a double T-beam, has both a partial circular portion TA and a rectilinearly extending portion GA. Preferably, a ratio between a rectilinear extending portion GA of rail 2 and a partially circularly extending portion TA assumes a value between 0.1 and 0.6, preferably between 0.2 and 0.5 and most preferably between 0.35 and 0.48.

LIST OF REFERENCE SIGNS 1 coupling component
2 rail
4 fastening plate
4' outermost edge
7 flanges
8 base plate
9 pin element
10 pin-side connection area
14 first cross member
15 side arm
16 first longitudinal beam
17 second longitudinal beam
18 second cross member
19 coupling structure
20 rail-side connection area
ZL pin length
MB sleeve width
TA partially circularly extending portion
GA rectilinearly extending portion
T1 first sub-area
T2 second sub-area
EB entrance region

The invention claimed is:

1. A cantilevered coupling component for an interface area between a semitrailer and a tractor unit, configured to be releasably connected to one another in the interface area via a pin element, comprising:
   a pin-side connection area for pivotably mounting the coupling component on the pin element; and
   a rail-side connection area for a slidable mounting of the coupling component on a rail of the semitrailer following a direction of translation, wherein the rail and the coupling component are mounted on an underside of the semitrailer, and wherein the rail includes a web which protrudes from the underside of the semitrailer and/or as a groove which is recessed into the underside of the semitrailer, and wherein the rail-side connection area has a coupling structure that is hooked into the rail when assembled.

2. The coupling component according to claim 1, wherein the rail runs at least partially in a rectilinear line and/or in a partial circle.

3. The coupling component according to claim 2, wherein a ratio between a length of a rectilinearly extending portion of the rail and a length of a partially circularly extending portion is between 0.1 and 0.6.

4. The coupling component of claim 3, wherein the ratio is between 0.2 and 0.5.

5. The coupling component of claim 4, wherein the ratio is between 0.35 and 0.48.

6. The coupling component according to claim 1, wherein the coupling component in an assembled state is pivotable about the pin element by at least a pivot angle of 145°.

7. The coupling component according to claim 1, wherein the coupling structure and/or a slide element for connection to the rail is arranged in the rail-side connection area.

8. The coupling component according to claim 7, wherein the coupling component, the slide element and/or the rail are dimensionally variable for increasing the potential angle of pivoting.

9. The coupling component of claim 8, wherein the coupling component, the slide element and/or the rail is extendable.

10. The coupling component according to claim 1, wherein a ratio of a first side length, which the coupling component, a slide element or the rail has in a retracted state, to a second side length, which the coupling, the slide element or the rail has in an extended state, is between 0.1 and 0.6.

11. The coupling component of claim 10, wherein the ratio is between 0.2 and 0.55.

12. The coupling component of claim 11, wherein the ratio is between 0.41 and 0.49.

13. The coupling component of claim 1, wherein coupling component is configured to automatically couple the tractor unit and the semitrailer.

14. The coupling component according to claim 1, wherein the rail and/or the coupling component includes multiple pieces.

15. The coupling component according to claim 1, wherein the pin-side connection area has a sleeve configured to connect to the pin element.

16. The coupling component according to claim 1, wherein a ratio between a sleeve width of a sleeve in the pin-side connection area and a pin length is between 0.1 and 0.5.

17. The coupling component of claim 16, wherein the ratio is between 0.25 and 0.48.

18. The coupling component of claim 17, wherein the ratio is between 0.35 and 0.45.

19. The coupling component according to claim 1, further comprises:
   a device for extending a line.

20. A system for automatically coupling a tractor unit and a semitrailer, comprising:
   a rail; and
   a coupling component configured to be mounted pivotably on a pin element of the semitrailer via a pin-side connection area and displaceably along a translation direction on the rail with a rail-side connection area, wherein the rail and the coupling component are mounted on an underside of the semitrailer, wherein the rail includes a web which protrudes from the underside of the semitrailer and/or as a groove which is recessed into the underside of the semitrailer and wherein the rail-side connection area has a coupling structure that is hooked into the rail.

21. A method for mounting a coupling component for upgrading a semitrailer, comprising:
   providing a coupling component having a pin-side connection area for pivotably mounting the coupling component on a pin element, and a rail-side connection area for slidably mounting the coupling component on a rail following a direction of translation; and
   mounting the rail and the coupling component on an underside of the semitrailer, the coupling component being connected to the pin element and the rail;
   wherein the rail includes a web which protrudes from the underside of the semitrailer and/or as a groove which is recessed into the underside of the semitrailer; and
   wherein the rail-side connection area has a coupling structure that is hooked into the rail.

\* \* \* \* \*

UNITED STATES PATENT AND TRADEMARK OFFICE
CERTIFICATE OF CORRECTION

PATENT NO. : 11,685,450 B2
APPLICATION NO. : 16/962449
DATED : June 27, 2023
INVENTOR(S) : Hartmann et al.

It is certified that error appears in the above-identified patent and that said Letters Patent is hereby corrected as shown below:

In the Specification

Column 1, Line 32:
"clewing" should be — slewing —

Column 4, Line 20:
"is" should be — are —

Column 4, Line 39:
After "in" insert -- a --

Column 4, Line 65:
"is" should be — are —

Column 5, Line 56:
"pretensioned" should be — pre-tensioned —

Column 6, Line 22:
Delete "It is shown in"

Column 7, Line 62:
"couple structure 9" should be — coupling structure 19 —

In the Claims

Column 9, Claim 9, Line 2:
"is" should be — are —

Column 9, Claim 10, Line 7:
"coupling, the" should be — coupling component, a —

Signed and Sealed this
Fifth Day of November, 2024

Katherine Kelly Vidal
*Director of the United States Patent and Trademark Office*

CERTIFICATE OF CORRECTION (continued)
U.S. Pat. No. 11,685,450 B2

Column 9, Claim 10, Line 8:
"an extended" should be — a retracted —

Column 10, Claim 19, Line 2:
"comprises" should be — comprising —